(12) United States Patent
Gibbs et al.

(10) Patent No.: US 8,789,108 B2
(45) Date of Patent: Jul. 22, 2014

(54) PERSONALIZED VIDEO SYSTEM

(75) Inventors: Simon J. Gibbs, San Jose, CA (US); Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 12/120,203

(22) Filed: May 13, 2008

(65) Prior Publication Data
US 2009/0133059 A1    May 21, 2009

Related U.S. Application Data

(60) Provisional application No. 60/989,413, filed on Nov. 20, 2007.

(51) Int. Cl.
*H04N 5/445* (2011.01)

(52) U.S. Cl.
USPC .............................................. 725/46

(58) Field of Classification Search
CPC ............ H04N 21/4532; H04N 21/458; H04N 21/4755; H04N 21/4622
USPC ................................ 725/9–21, 46, 91, 32–36
See application file for complete search history.

(56) References Cited

U.S. PATENT DOCUMENTS

| | | | |
|---|---|---|---|
| 5,945,988 A * | 8/1999 | Williams et al. .............. | 715/747 |
| 5,948,061 A | 9/1999 | Merriman et al. | |
| 5,974,406 A | 10/1999 | Bisdikian et al. | |
| 5,983,237 A | 11/1999 | Jain et al. | |
| 5,995,959 A | 11/1999 | Friedman et al. | |
| 6,151,603 A | 11/2000 | Wolfe | |
| 6,334,127 B1 | 12/2001 | Bieganski et al. | |
| 6,438,579 B1 | 8/2002 | Hosken | |

(Continued)

FOREIGN PATENT DOCUMENTS

| | | | |
|---|---|---|---|
| KR | 1020020005147 A | 1/2002 | |
| KR | 1020020006810 A | 1/2002 | |

(Continued)

OTHER PUBLICATIONS

Moraveji, N. et al., "DynaLine: A Non-Disruptive TV User Interface for Passive Browsing of Internet Video", Microsoft Research Technical Report, 2006, 4 pages, Microsoft Research, USA.

(Continued)

*Primary Examiner* — Benjamin R Bruckart
*Assistant Examiner* — Aklil Tesfaye
(74) *Attorney, Agent, or Firm* — Kenneth L. Sherman, Esq.; Michael Zarrabian, Esq.; Sherman & Zarrabian LLP

(57) ABSTRACT

A media device suitable for playing video content including television programming is provided. The media device comprises a device usage monitor configured to substantially automatically monitor selected usage information related to video content that is played on the media device; a rating engine configured to substantially automatically generate content ratings for specific video content that has been played by the media device, wherein the content ratings are based at least in part of the usage information; and a user interface suitable for presenting a plurality of content channels to the user, wherein at least some of the presented channels are personalized channels that include video content that is selected based at least in part on the content ratings generated by the rating engine.

46 Claims, 12 Drawing Sheets

(56) References Cited

U.S. PATENT DOCUMENTS

| | | |
|---|---|---|
| 6,721,955 B2 | 4/2004 | Khoo et al. |
| 6,774,926 B1 | 8/2004 | Ellis et al. |
| 7,055,165 B2 | 5/2006 | Connelly |
| 7,110,998 B1 | 9/2006 | Bhandari et al. |
| 7,162,473 B2 | 1/2007 | Dumais et al. |
| 7,165,080 B2 | 1/2007 | Kotcheff et al. |
| 7,243,362 B2 | 7/2007 | Swix et al. |
| 7,386,542 B2 | 6/2008 | Maybury et al. |
| 7,389,224 B1 | 6/2008 | Elworthy |
| 7,389,307 B2 | 6/2008 | Golding |
| 7,424,678 B2 | 9/2008 | Sezan et al. |
| 7,552,193 B2 | 6/2009 | Carro |
| 7,590,998 B2 | 9/2009 | Hanley |
| 7,739,271 B2 | 6/2010 | Cook et al. |
| 7,761,885 B2 | 7/2010 | Labrou et al. |
| 7,882,262 B2 | 2/2011 | Bhattacharya et al. |
| 7,882,523 B2 | 2/2011 | Utsuki et al. |
| 8,001,561 B2 | 8/2011 | Gibbs et al. |
| 8,001,568 B2 | 8/2011 | Thurston et al. |
| 8,010,536 B2 | 8/2011 | Nemeth et al. |
| 8,015,192 B2 | 9/2011 | Rathod et al. |
| 8,042,136 B2 | 10/2011 | Narahara et al. |
| 8,079,046 B2 | 12/2011 | Ali |
| 8,209,724 B2 | 6/2012 | Rathod et al. |
| 8,230,364 B2 | 7/2012 | Trepess |
| 8,233,775 B2 | 7/2012 | Kunii et al. |
| 8,364,670 B2 | 1/2013 | Peckover |
| 2001/0003214 A1 | 6/2001 | Shastri et al. |
| 2001/0023433 A1 | 9/2001 | Natsubori et al. |
| 2002/0022491 A1 | 2/2002 | McCann et al. |
| 2002/0053084 A1* | 5/2002 | Escobar et al. ............... 725/47 |
| 2002/0124263 A1 | 9/2002 | Yokomizo |
| 2002/0152465 A1* | 10/2002 | Khoo et al. .................. 725/46 |
| 2002/0194607 A1* | 12/2002 | Connelly ..................... 725/87 |
| 2002/0199194 A1* | 12/2002 | Ali ............................. 725/46 |
| 2003/0020744 A1* | 1/2003 | Ellis et al. .................. 345/723 |
| 2003/0066090 A1* | 4/2003 | Traw et al. ................. 725/114 |
| 2003/0126597 A1 | 7/2003 | Darby et al. |
| 2003/0226146 A1* | 12/2003 | Thurston et al. ............. 725/46 |
| 2004/0073924 A1* | 4/2004 | Pendakur .................... 725/46 |
| 2004/0088375 A1* | 5/2004 | Sethi et al. ................. 709/218 |
| 2004/0268419 A1 | 12/2004 | Danker et al. |
| 2005/0080764 A1 | 4/2005 | Ito |
| 2005/0096978 A1 | 5/2005 | Black |
| 2005/0120034 A1* | 6/2005 | Sezan et al. ................ 707/100 |
| 2005/0120391 A1 | 6/2005 | Haynie et al. |
| 2005/0177555 A1 | 8/2005 | Alpert et al. |
| 2005/0216547 A1 | 9/2005 | Foltz-Smith et al. |
| 2006/0066573 A1 | 3/2006 | Matsumoto |
| 2006/0080321 A1 | 4/2006 | Horn et al. |
| 2006/0084430 A1 | 4/2006 | Ng |
| 2006/0123455 A1* | 6/2006 | Pai et al. .................... 725/133 |
| 2006/0135156 A1 | 6/2006 | Malu et al. |
| 2006/0218035 A1 | 9/2006 | Park et al. |
| 2007/0038514 A1 | 2/2007 | Patterson et al. |
| 2007/0060109 A1 | 3/2007 | Ramer et al. |
| 2007/0061858 A1 | 3/2007 | Ura |
| 2007/0214123 A1 | 9/2007 | Messer et al. |
| 2007/0266403 A1* | 11/2007 | Ou et al. ..................... 725/46 |
| 2008/0022309 A1* | 1/2008 | Begeja et al. ............... 725/46 |
| 2008/0046312 A1 | 2/2008 | Shany et al. |
| 2008/0208796 A1 | 8/2008 | Messer et al. |
| 2008/0221989 A1 | 9/2008 | Messer et al. |
| 2008/0235393 A1 | 9/2008 | Kunjithapatham et al. |
| 2008/0250010 A1 | 10/2008 | Rathod et al. |
| 2009/0125951 A1* | 5/2009 | Agricola et al. ............. 725/91 |
| 2010/0122294 A1* | 5/2010 | Craner ........................ 725/41 |

FOREIGN PATENT DOCUMENTS

| | | | |
|---|---|---|---|
| KR | 1020040052339 A | 6/2004 | |
| KR | 1020060027226 A | 3/2006 | |
| WO | 0137465 A2 | 5/2001 | |
| WO | 0243310 A2 | 5/2002 | |
| WO | 03038563 A2 | 5/2003 | |
| WO | 2005055196 A2 | 6/2005 | |
| WO | 2007004110 A2 | 1/2007 | |

OTHER PUBLICATIONS

Miyamori, H. et al., "Webified Video: Media Conversion from TV Programs to Web Content for Cross-Media Information Integration", Proceedings of the 16th International Conference on Database and Expert Systems Applications (DEXA '05), 2005, pp. 176-185, Springer-Verlag Berlin, Germany.

Copernic Inc., "Copernic—Software to Search, Find, and Manage Information", http://www.copernic.com, downloaded Sep. 19, 2008, p. 1, Copernic Inc., USA.

Realnetworks, Inc., "Introducing RealDVD", http://www.real.com, downloaded Sep. 19, 2008, p. 1, RealNetworks, Inc., USA.

Microsoft Corporation, "Windows Media Player 10", http://www.microsoft.com/windows/windowsmedia/player/10/default.aspx, downloaded Sep. 19, 2008, p. 1, Microsoft Corporation, USA.

AOL LLC, "AOL.com—Welcome to AOL", http://www.aol.com, downloaded Sep. 19, 2008, pp. 1-2, AOL LLC., USA.

Ask.com, "Ask.com Search Engine—Better Web Search", http://www.ask.com, downloaded Sep. 19, 2008, p. 1, Ask.com, USA.

Google, Inc., "Welcome to AdSense", http://www.google.com/adsense, downloaded Sep. 24, 2008, pp. 1-2, Google, Inc., USA.

Google, Inc., "Welcome to AdWords", http://www.adwords.google.com, downloaded Sep. 24, 2008, pp. 1-2, Google, Inc., USA.

Allen, C. et al, "Internet World Guide to one-on-one web marketing," Internet World, Jan. 1, 1998, pp. 235-265, Mecklermedia, Westport, CT, USA.

Extended European Search Report mailed Jul. 21, 2009 in European Application No. 08152295.5 from the European Patent Office, 7 pages, Munich, Germany.

Apple Inc., "Apple iTunes", http://www.apple.com/itunes/, Apr. 28, 2003, 2 pages, Apple Inc., United States.

Babaguchi, N. et al., "Intermodal Collaboration: A Strategy for Semantic Content Analysis for Broadcasted Sports Video," Proceedings of the 2003 IEEE International Conference on Image Processing (ICIP '03), Sep. 2003, pp. 13-16, vol. 1, IEEE, USA.

Brill, E., "A Simple Rule-Based Part of Speech Tagger," Proceedings of the Workshop on Speech and Natural Language (HLT '91), Feb. 1992, pp. 152-155, Association for Computational Linguistics, USA.

Google, Inc., "Google", http://www.google.com, Aug. 1998, p. 1, Google, Inc., USA.

Google, Inc., "Google Desktop Download", http://desktop.google.com, Oct. 15, 2004, p. 1, Google, Inc., USA.

Henzinger, M. et al., "Query-Free News Search", Proceedings of the 12th International Conference on World Wide Web (WWW '03), May 2003, pp. 1-10, ACM Press, USA.

Livingston, K. et al., "Beyond Broadcast: A Demo," Proceedings of the 8th International Conference on Intelligent User Interfaces, Jan. 2003, 1 page, ACM Press, USA.

Microsoft Corporation, "Microsoft Windows Media—Your Digital Entertainment Resource", http://www.microsoft.com/windows/windowsmedia/default.mspx, Feb. 1999, 1 page, Microsoft Corporation, USA.

Microsoft Corporation, "MSN TV: Home page", http://www.webtv.com/pc, Feb. 2006, 1 page, Microsoft Corporation, USA.

Opera Software ASA, "Opera for Devices—Opera Software ASA", http://www.opera.com/products/devices/, Mar. 2006, pp. 1-2, Opera Software ASA, USA.

Rau, L.F. et al, "Domain-Independent Summarization of News", In Summarizing Text for Intelligent Communication Workshop, Jun. 1994, 6 pages, Schloss Dagstuhl GmbH, Dagstuhl, Germany.

Spalti, M.W., "Finding and Managing Web Content with Copernic 2000", Library Computing, Sep. 2000, pp. 217-221, vol. 18, No. 3, Sage Publications, USA.

Tjondronegoro, D. et al., "Extensible Detection and Indexing of Highlight Events in Broadcasted Sports Video", Proceedings of the 29th Australasian Computer Science Conference (ACSC '06), Jan. 2006, pp. 237-246, vol. 48, Australasian Computer Society Inc., Sydney, Australia.

(56) References Cited

OTHER PUBLICATIONS

Wachman, J. et al., "Tools for Browsing a TV Situation Comedy Based on Content Specific Attributes", Multimedia Tools and Applications, Mar. 2001, pp. 255-284, vol. 13, No. 3, Kluwer Academic Publishers, Boston, Massachusetts, USA.

Yahoo! Inc., "Yahoo! Search—Web Search", http://search.yahoo.com, Dec. 1998, p. 1, Yahoo!, USA.

Zhuang, Y. et al, "Applying Semantic Association to Support Content-Based Video Retrieval", Proceedings of the 1998 International Workshops on Very Low Bitrate Video Coding (VLBV '98), Oct. 1998, pp. 1-4, University of Illinois, USA.

Livingston, K. et al., "Beyond Broadcast", Proceedings of the 8th International Conference on Intelligent User Interfaces, Jan. 2003, pp. 260-262, ACM Press, New York, USA.

International Search Report and the Written Opinion mailed Aug. 20, 2008 from the International Searching Authority and Korean Intellectual Property Office for International Application No. PCT/KR2008/001941, 10 pages, Seo-gu, Daejeon, Republic of Korea.

International Search Report and the Written Opinion mailed Jun. 26, 2008 from the International Searching Authority and Korean Intellectual Property Office for International Application No. PCT/KR2008/001558, 10 pages, Seo-gu, Daejeon, Republic of Korea.

International Search Report and the Written Opinion mailed May 15, 2008 from the International Searching Authority and Korean Intellectual Property Office for International Application No. PCT/KR2008/000537, 16 pages, Seo-gu, Daejeon, Republic of Korea.

U.S. Non-Final Office Action mailed Nov. 9, 2010 for U.S. Appl. No. 11/969,837.

U.S. Final Office Action mailed Apr. 13, 2011 for U.S. Appl. No. 11/969,837.

U.S. Non-Final Office Action mailed Aug. 12, 2011 for U.S. Appl. No. 11/969,837.

U.S. Non-Final Office Action mailed Sep. 28, 2011 for U.S. Appl. No. 11/825,161.

U.S. Final Office Action mailed Jan. 30, 2012 for U.S. Appl. No. 11/969,837.

U.S. Final Office Action mailed Feb. 23, 2012 for U.S. Appl. No. 11/825,161.

U.S. Non-Final Office Action mailed Jan. 28, 2013 for U.S. Appl. No. 11/825,161.

U.S. Notice of Allowance for U.S. Appl. No. 11/825,161 mailed Dec. 18, 2013.

\* cited by examiner

Danny Devito, Jason Alexander: OneVoice Oct 18!
From: OneVoiceMovement
Views: 30,944
Comments: 253

Videos (19)　　　　　　　　　Subscribe to OneVoiceMovement's video

Videos | Most Viewed | Most Discussed　　　　　[　　　　] [Search]

OneVoice Movement:
Eye-Opener!
05:34
Added: 1 year ago
Views: 320,591

Danny Devito, Jason
Alexander: OneVoice
Oct 18!
01:07
Added: 4 months ago
Views: 30,944

Daniel Lubetzky
Interview with CNN
International
04:10
Added: 4 months ago
Views: 5,613

OneVoice Movement
Jerusalem Statement
02:41
Added: 1 year ago
Views: 5,470

OneVoice Israel at
Kikar Rabin
01:28
Added: 7 months ago
Views: 2,271

OneVoice: The King
Comes to Tel Aviv!
01:27
Added: 6 months ago
Views: 13,131

OneVoice: One Million
Voices to End the
Conflict!
01:01
Added: 5 months ago
Views: 514,419

OneVoice: Eye Opener -
Hebrew
04:33
Added: 6 months ago
Views: 3,382

OneVoice Movement
Ramallah Statement
03:25
Added: 1 year ago
Views: 2,975

See All 19 Videos

Report background grapic.

FIG. 2B (Prior Art)

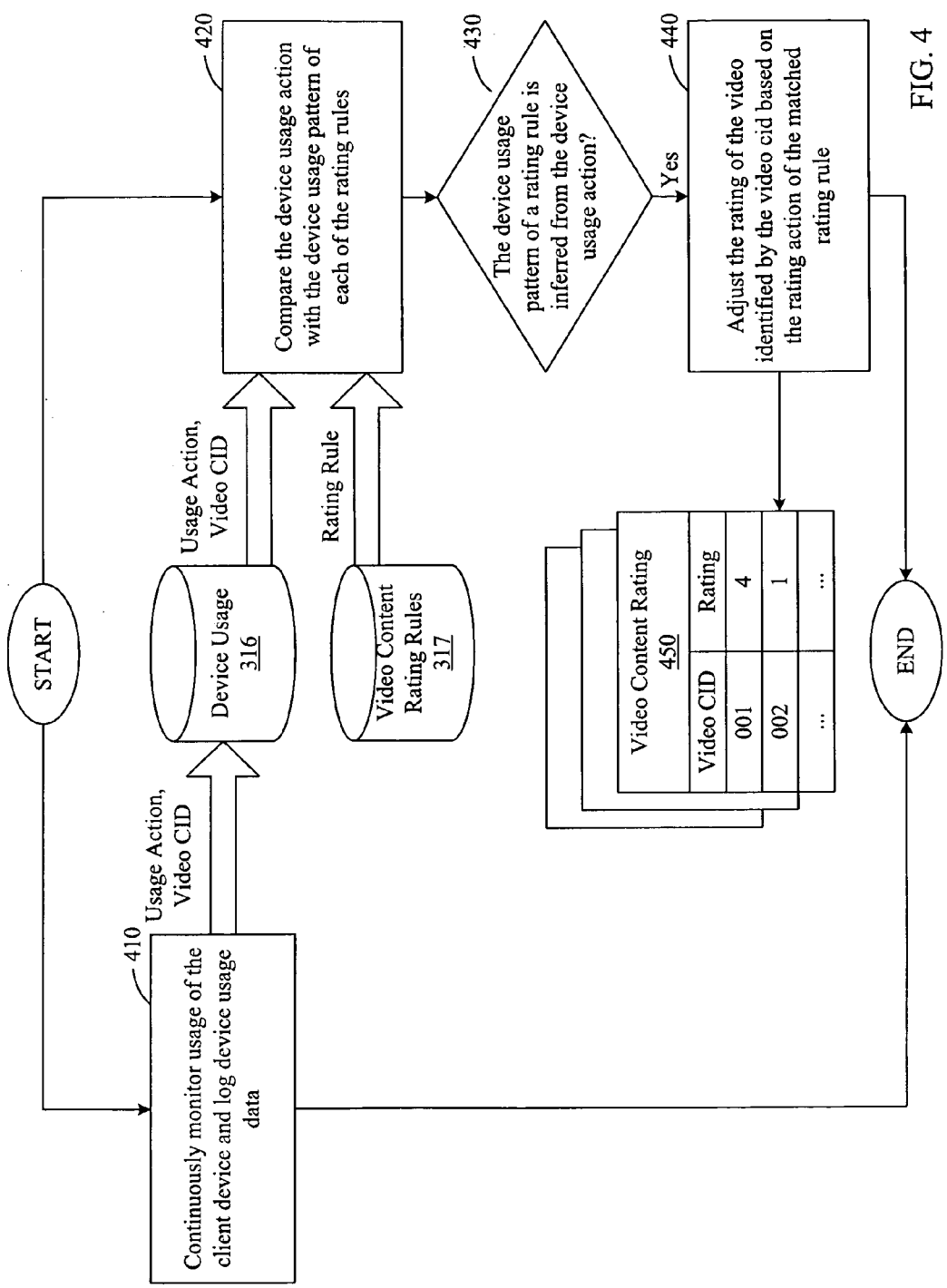

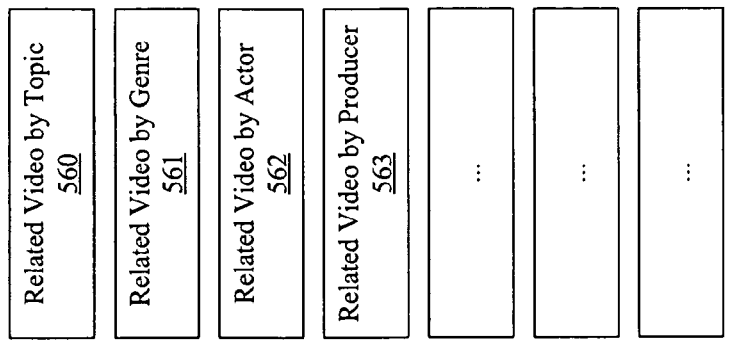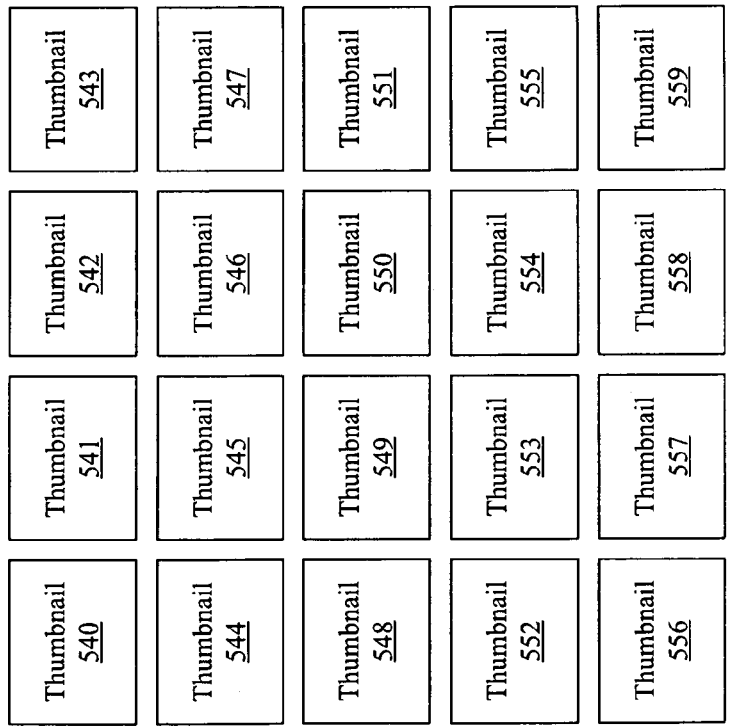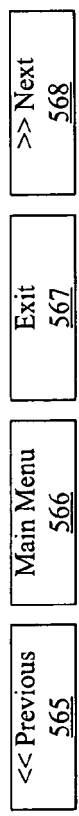
FIG. 5B

Related Video to Video 546 by Genre

| Thumbnail 570 | Thumbnail 571 | Thumbnail 572 | Thumbnail 573 |
| --- | --- | --- | --- |
| Thumbnail 574 | Thumbnail 575 | Thumbnail 576 | Thumbnail 577 |

Related Video by Topic 580
Related Video by Genre 581
Related Video by Actor 582
Related Video by Producer 583
...
...
...

| << Previous 584 | Main Menu 585 | Exit 586 | >> Next 587 |

PERSONALIZED VIDEO SYSTEM

CROSS REFERENCE TO RELATED APPLICATION

This patent application takes priority under 35 U.S.C. 119 (e) to U.S. Provisional Patent Application No. 60/989,413, filed on Nov. 20, 2007, entitled "A PERSONALIZED VIDEO RECOMMENDER SYSTEM" by Gibbs et al., which is hereby incorporated by reference in its entirety and for all intents and purposes.

FIELD OF THE INVENTION

The present invention generally relates to systems and methods for providing personalized video content to users of consumer electronic or multimedia devices capable of supporting video operations, such as viewing, recording and playing back, or downloading videos. More specifically, the present invention relates to providing personalized video content and optionally personalized advertisements to the device users based on the users' usage of the consumer electronic or multimedia devices with respect to viewing, recording and playing back, or downloading videos directly on the devices.

BACKGROUND OF THE INVENTION

Presently, there is a vast amount of video media available to every person. From films or movies to broadcast television programs to cable or satellite television programs to home movies or user-created video clips, there are many repositories and databases from which people may choose and obtain video content in various formats, and the amount of video content available continues to grow at a very high rate. Broadcast, cable, or satellite companies often provide hundreds of different channels for viewers to choose from. Movie rental companies such as Netflix and Blockbuster have tens, even hundreds, of thousands of titles on DVDs (digital video disc) or video cassettes. More recently, the Internet has also lent its unique capability and become a great repository and distribution channel for video media world-wide. Websites such as YouTube and AOL Video have immense video collections, often millions of video clips, contributed by users from all over the world.

Faced with such a great and overwhelming number of choices, people often have a difficult time finding the specific video content they are looking for. For example, suppose a person is looking for videos related to the subject matter of figure skating at YouTube's website, and conducts a keyword search using the term "figure skating." A recent search of this type would present the person with over fifty-six thousand video clips, all presumably relating to figure skating, and the amount of content that is available is continually growing. It is very unlikely that the person will watch all fifty-six thousand video clips to find those few that he or she likes. Using more specific search terms helps narrow down the search results. For example, conducting a search using the term "figure staking Olympic championship" instead of just "figure skating" at YouTube's website will result in over one hundred related video clips, a much smaller number compare to the first search result, and yet still a lot of video clips for the person to go through. In addition, using more specific search terms sometimes results in certain video clips being filtered out unintentionally or mistakenly, perhaps due to these video clips having incorrect, imprecise, or incomplete content descriptions. On the other hand, sometimes people are not certain what terms or keywords to search for. For example, suppose a person is looking for a movie to rent at Netflix's website. The person wants to rent a comedy-type movie, but does not have any specific titles in mind. In this case, it is difficult for the person to search for a specific movie using a few keywords. Instead, the person is more likely to browse through the comedy category and read about the descriptions of individual movies in order to decide whether he or she likes that particular movie. Since there are hundreds or thousands of movies available in each category, it often takes a long time to find a particular movie to the person's liking.

When presented with too many choices, people often give up after going through the first few choices on the list, perhaps due to lack of time or loss of patience or interest. As a result, the majority of the available video content are known only to a very few people, while most people are aware of only a small number of selected or dominant videos. This scenario may be represented using a polynomial curve 100 as shown in FIG. 1, where the x-axis represents the number of available video content and the y-axis represents the number of times individual pieces of video content have been viewed. To the left of the curve 100, a small number of the available video content are viewed many times, and they are the dominant video content. To the right, the majority of the video content are viewed only a few times, which is sometimes referred to as the "long tail" of the curve 100.

For most people, there is video content in the long tail portion of the curve 100 that they will want to view, and yet, they are not aware of the existence of these videos. To help people locate video content that they are unaware of and yet may enjoy, websites often make recommendations to their customers or users based on various criteria. For example, when a person rents a movie from Netflix, Netflix recommends other movies selected from the same genre or related subject matter or by the same actors and/or actresses. When a person buys a DVD from Amazon, Amazon recommends other movies bought by those customers who also have bought this DVD. To a certain extent, such websites strive to provide personalized services toward individual customers.

On the other hand, users of consumer electronic devices often are not afforded as many personalized choices as provided by the websites. For example, suppose a person wishes to watch television. He or she may only choose from a fixed number of available programs aired on a fixed number of channels at any given time. The person generally is not able to decide what program is aired on what channel at what time. Such decisions usually rest with the television stations. Thus, if the person wishes to watch a program that is not aired on any of the available channels, he or she will have to forego the desire or find alternative options.

SUMMARY OF THE INVENTION

Broadly speaking, the present invention generally relates to providing personalized video content and optionally personalized advertisements to users of consumer electronic or multimedia devices capable of supporting video operations. The video content and optionally the advertisements are automatically selected based at least in part on the usage information of the consumer electronic or multimedia devices with respect to operating videos on the consumer electronic or multimedia devices.

According to one embodiment, a method of providing personalized video content is provided. The method comprises automatically determining at least one personalized channel based on device usage information for a device capable of performing at least one video operation; and automatically determining at least one piece of video content for each of the at least one personalized channel based on the device usage information.

According to another embodiment, a method of providing personalized video content to a user of a consumer electronic device is provided. The method comprises the steps of transmitting video content ratings and device user profiles substantially automatically determined based on videos played on a media device suitable for playing video media to a remote content server; receiving a plurality of personalized channels and personalized video content associated with the plurality of personalized channels selected based at least in part on the content ratings and the device user profiles from the remote content server; presenting the plurality of personalized channels and personalized video content associated with the plurality of personalized channels to a user of the media device; receiving a selection of a particular piece of personalized video content from the user; and playing the selected piece of personalized video content on the media device.

According to another embodiment, a media device suitable for playing video content including television programming is provided. The device comprises a device usage monitor configured to substantially automatically monitor selected usage information related to video content that is played on the media device; a rating engine configured to substantially automatically generate content ratings for specific video content that has been played by the media device, wherein the content ratings are based at least in part of the usage information; and a user interface suitable for presenting a plurality of content channels to the user, wherein at least some of the presented channels are personalized channels that include video content that is selected based at least in part on the content ratings generated by the rating engine.

According to another embodiment, a media device suitable for playing video content is provided. The device comprises a device usage monitor configured to substantially automatically monitor selected usage information related to video content that is played by the media device; a rating engine configured to substantially automatically generate content ratings for specific video content that has been played on the media device, wherein the content ratings are based at least in part of the usage information; and a user interface suitable for presenting personalized video content to the user, wherein the personalized video content is selected based at least in part on the content ratings generated by the rating engine.

According to another embodiment, a video content provider for providing personalized video content to a user of a media device, wherein the media device is capable of playing video media, and wherein the video content provider is a part of the media device is provided. The video content provider comprises a device usage monitor configured to substantially automatically monitor selected usage of the media device with respect to playing videos on the media device; a rating engine configured to substantially automatically generate content ratings for the videos that have been played on the media device based at least in part on the selected usage of the media device and in reference to a plurality of rating rules; and a user interface suitable for presenting a plurality of channels to the user, wherein at least some of the presented channels are personalized channels that include video content that is selected based at least in part on the content ratings generated by the rating engine, in response to a selection of a particular channel by the user from the plurality of presented channels, presenting a plurality of distinct pieces of video content associated with the selected channel that may be viewed by the user; and in response to a selection of a particular piece of video content by the user from the plurality of presented distinct pieces of video content associated with the selected channel, causing the media device to play the selected piece of video content.

According to another embodiment, a consumer electronic device suitable for playing video media is provided. The device comprises a transceiver suitable for networked communication with a remote content server system to receive a plurality of personalized channels and personalized video content associated with the plurality of personalized channels from the remote content server, wherein the plurality of personalized channels and personalized video content are selected based at least in part on usage patterns of the consumer electronic device that are automatically detected by the consumer electronic device; and a user interface suitable for presenting the plurality of personalized channels and the personalized video content to a user of the consumer electronic device and enabling the user to select a particular piece of video content to be played on the consumer electronic device.

According to another embodiment, a system for providing personalized video content via consumer electronic devices is provided. The system comprises at least one consumer electronic device, wherein each consumer electronic device is communicatively connected with a server, and wherein each consumer electronic device is suitable for (1) playing video content, (2) substantially automatically rating the video content played on the consumer electronic device based at least in part on usage of the consumer electronic device for playing the video content, (3) transmitting the video content ratings to the server, (4) receiving personalized video content selected by the server, and (5) presenting the personalized video content selected by the server to a user; and the server suitable for (1) receiving video content ratings from each consumer electronic device, (2) selecting the personalized video content for each consumer electronic device based at least in part on the video content ratings received from that consumer electronic device, and (3) transmitting the personalized video content selected for each consumer electronic device to that consumer electronic device.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B shows a portion of a sample web page from YouTube for a particular YouTube member who has established his or her own channel.

FIG. 4 shows a simplified embodiment of a system and method for automatically rating video content that has been operated on a client device.

FIG. 5B shows one embodiment of a second-level menu that lists the individual pieces of video content contained in a specific smart channel.

FIG. 5C shows one embodiment of a menu that presents a list of videos that relates to a selected piece of video content.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

Figure 1:
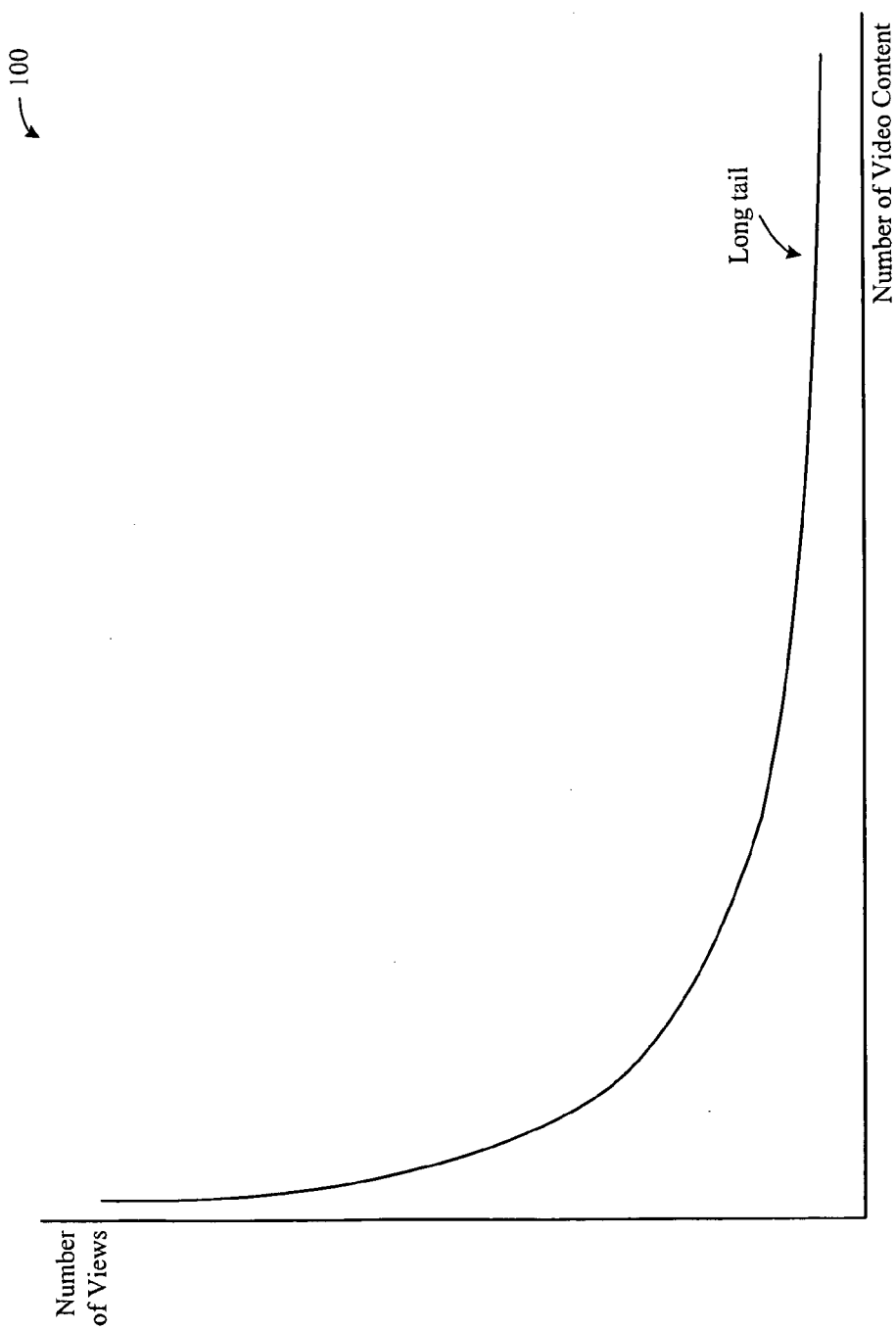
FIG. 1 illustrates a polynomial curve that may be used to represent the "long tail" scenario.
Figure 2A:
FIG. 2A shows a portion of a sample web page from YouTube where several channels are displayed.

The meaning of the word "channel" varies somewhat when the word is used in different contexts. A television channel generally refers to a television, cable, or satellite station. More recently, the usage of the word has been extended to websites providing video content, such as YouTube or StumbleVideo, although each website may use the word to refer to slightly different concepts. At some websites, a channel is similar to a category, where each channel includes a list of videos about similar subject matters. At some websites, a channel is similar to a genre, where each channel includes a list of videos from the same genre, such as drama, comedy, documentary, etc. At some websites, a channel is similar to a profile. For example, at YouTube, each channel is associated with a YouTube member who has uploaded videos. FIG. 2A shows a portion of a sample web page from YouTube's website where several channels are displayed, each channel being associated with a YouTube member. A user may click any of the displayed channels, i.e., the thumbnails or names, to view videos uploaded by that YouTube member. FIG. 2B shows a portion of a sample web page from YouTube's website for a particular YouTube member who has established his or her own channel called "OneVoiceMovement." In this example, this particular YouTube member has uploaded nineteen videos, and the titles and thumbnails of nine of the nineteen videos are shown in this web page. A user may click any of the video title or thumbnail to view the uploaded video clip.

According to various embodiments, systems and methods for presenting personalized video content to users of consumer electronic or multimedia devices are provided. The devices are capable of supporting video operations, such as viewing, recording, playing back, downloading, or upholding videos. Generally, although not necessarily, the devices are able to communicate with one or more servers via, for example, the Internet. The consumer electronic devices may be televisions, including CRT (Cathode ray tube), projection, LCD (liquid crystal display), plasma, or high-definition televisions; video recorders and/or players, including VCRs (video cassette recorder), PVRs (personal video recorder), or DVRs (digital video recorder); cable or set top boxes; audio/video controllers, etc. The multimedia devices may be mobile or personal media players, such MP3 and MP4 players, smart phones, PDAs (personal digital assistant), PCs (personal computer), etc. These consumer electronic or multimedia devices are referred to as "client devices." The recommended video content is personally tailored to the users of these client devices based on the users' tastes and/or likings in the video content.

On the client side, device usage with respect to viewing, recording, playing back, downloading, and uploading video content directly on a client device are continuously monitored and recorded. The recorded device usage data is then used to automatically rate the video content that has been operated on the client device. Addition video content information is constructed for the video content by extracting and obtaining video content information from various sources. Profile(s) for the user(s) of the device is/are collected. Periodically, the video content ratings and device user profiles are sent to a server.

Each client device has a set of personalized channels, which may herein be referred to as "smart channels." These personalized channels may be provided in additional to a set of standard channels. For example, suppose the client device is a television or a cable or set top box. The television or the cable box has a set of standard channels, e.g., CNN, ABC, NBC, CBS, etc., for traditional television programs. In addition, the television or the cable box also has a set of personalized channels tailored to the individual users of the television or the cable box. Thus, while televisions within the same locale may have a similar set of available standard channels, the personalized channels will typically vary from television to television.

Initially, the client device may have a set of default smart channels. Subsequently, according to some embodiments, users of the client device may add or remove channels to or from the default set of smart channels. Alternatively or in addition, the smart channels may be automatically adjusted based on the usage information of the client device, especially the usage information with respect to performing video operations, such as viewing, recording, and/or playing back videos, on the client device.

According to some embodiments, each smart channel includes one or more pieces of video content recommended by the server and personally tailored to the users of the client device, and there is no limitation on the number of pieces of video content that may be contained in a smart channel. Often, although not necessarily, the pieces of video content contained in a particular smart channel are related to each other based on some criteria. For example, they may be related to the same or similar subject matter, produced by the same entity, created within a particular period of time, feature same actors and/or actresses, etc. The video content contained in a smart channel may change from time to time, e.g., video content may be added or removed from a channel.

Each client device includes a presentation system, such as a user interface, that enables the users to manipulate the smart channels and the video content contained in each of the smart channels. For example, the device users may request recommendations on video content from the server, select a particular smart channel to review the video content contained in that channel, select a particular piece of video content for viewing, etc. In addition, as the users select and view some of the video content selected in any of the channels i.e., smart or traditional, on the client device, the presentation system monitors and records the usage information of the client device. The recorded device usage data is subsequently used to help rate the video content that has been viewed on the client device. If an advertisement is viewed by the device users, the client device sends an "ad hit" report to the server so that the server is aware which advertisement is viewed by the device users. Such information subsequently may be used to collect revenue from ad providers.

On the server side, the server collects and aggregates video content information and advertisements from multiple sources and stores them in one or more databases communicatively connected to the server. When the server receives a request from a client device for video content recommendation, the server selects the appropriate video content and/or advertisements based at least in part on the content information of the individual pieces of video as well as video content ratings and device user profiles previously received from the requesting client device. The selected video content is ranked according to some predefined criteria. In addition, some personalized advertisements may be associated with selected ones of the video content and may optionally be ranked as well according to some predefine criteria. The server then sends the personalized video content and advertisements to the client device to be presented to the users of the client device.

Each client device is communicatively connected to the server, such as via the Internet, cable connection, or other network. Typically, client devices will be physically located remotely from the server. However, the system works equally well on client devices physically located close to the server or even next to the server.

Figure 3:
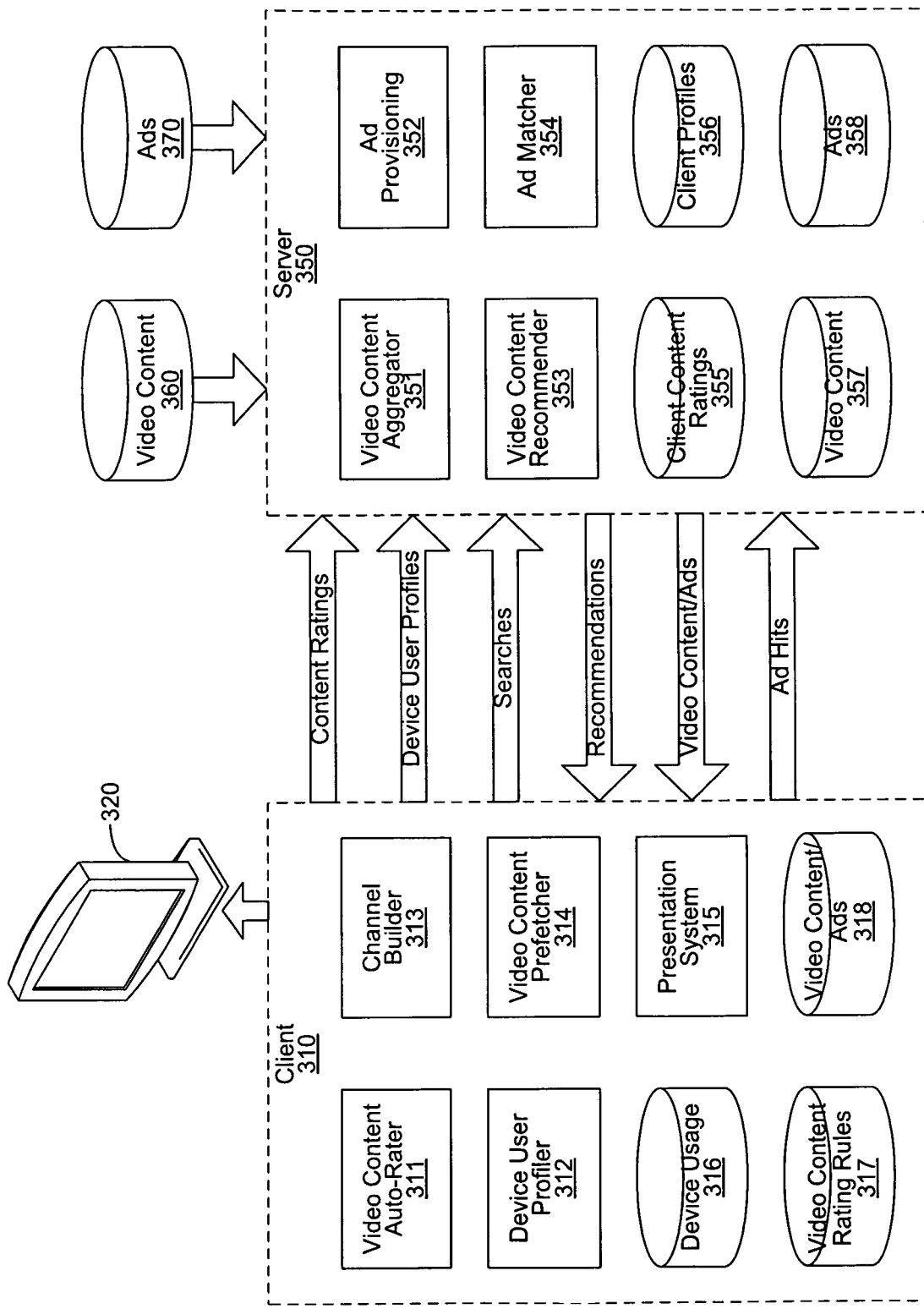
FIG. 3 shows one embodiment of a system for making personalized recommendations of video content and advertisements to users of a client device in accordance with the present invention.

FIG. 3 shows one particular embodiment of a system for making personalized recommendations of video content and advertisements to users of a client device. According to this embodiment, the client device 310 has a video content auto-rater responsible for automatically rating the video content that has been operated directly on the client device 310, a device user profiler 312 responsible for profiling the user(s) of the client device 310 i.e., collecting user information to such as user characteristics and/or preferences, a channel builder 313 responsible for maintaining the smart channels on the client device 310, including requesting and obtaining personalized video content and advertisements from the server 350 for the smart channels, a video content prefetcher 314 responsible for prefetching at least some of the video content contained in the smart channels, and a presentation system 315 that enables the users of the client device 310 to manipulate and control the smart channels and select video content from the smart channels for viewing, and for monitoring and recording user actions with respect to using the client device 310. Each of these components will be described in more detail below.

The server 350 has a video content aggregator 351 responsible for obtaining and aggregating video content information from multiple sources 360 and storing the aggregated video content information in a video content database 357 communicatively connected to the server 350, an ad provisioning 352 responsible for obtaining advertisements from multiple sources 370 and storing the advertisements in an ads database 358 communicatively connected to the server 350, a video content recommender 353 responsible for selecting and ranking video content personally tailored to the users of a particular client device, e.g., client device 310, upon receiving a request from the client device, and an ad matcher 354 responsible for selecting advertisements personally tailored to the users of a particular client device along with the recommended video content. Each of these components will be described in more detail below.

The components shown in FIG. 3 for the client device 310 and the server 350 are according to one specific embodiment of the personalized video content system. According to other embodiments, some, most, or all of these components may reside either on the client or on the server. For example, if a client device has sufficient resources, such as memory storage and processing power, it is possible for all of the components to reside locally on the client device, thus eliminating the need of a server. On the other hand, most of the components may reside on the server in order to ease the demand and workload on the client devices. For example, the client devices may only need to monitor the device usage with respect to video operations performed directly on the client devices, send the raw device usage data to the server, and receive recommended video content and advertisements from the server. The server rates and profiles the video content for each client device based on the raw device usage data received from that client device, and sends personalized video content and advertisements to each client device.

Client Components

On the client side, the video content auto-rater 311 automatically rates the video content that has been operated, i.e., viewed, recorded, played back, downloaded, uploaded, etc., directly on the client device 310 based on the usage of the client device 310 with respect to the video operations and in reference to a set of predefined rating rules. The functionalities of the video content auto-rater 311 may be widely varied. A few appropriate video content auto-raters are described in more detail in co-pending U.S. patent application Ser. No. 12/120,217, filed on May 13, 2008 (concurrently herewith on the same day as the present application), entitled "SYSTEM AND METHOD FOR AUTOMATICALLY RATING VIDEO CONTENT" by Gibbs et al., which is hereby incorporated by reference in its entirety and for all intents and purposes.

To summarize, FIG. 4 shows a simplified embodiment of a system and method for automatically rating video content that has been operated on a client device 310. Each piece of video content is identified by a unique content identifier (CID). User actions performed on the client device 310 with respect to operating the video content directly on the client device 310 are continuously monitored and automatically recorded in a device usage data storage or database 316 (step 410). According to some embodiments, this monitoring process is handled by the presentation system 315, which is described in more detail below. Alternatively, the video content auto-rater 311 may monitor the device usage and record the device usage data itself. The device usage data 316 is used to automatically determine the ratings of the video content in reference to a set of predefined video content rating rules 317. Each rating rule 317 includes a device usage pattern that describes user actions performed on the client device 310 with respect to video operations and a rating action indicating adjustments to the content rating of the video content that has been operated on the client device 310 based on characteristics described by the device usage pattern that are inferred from the recorded device usage data 316.

For each piece of video content that has been operated on the client device 310, the device usage data 316 associated with the piece of video content is compared with the device usage pattern of each of the rating rules 317 (step 420). If the device usage pattern of a particular rating rule is inferred from the device usage data 316 associated with operating the piece of video content, the content rating 450 of that piece of video content is adjusted based on the rating action specified in the matched rating rule (step 430).

In addition to rating the video content, optionally, other information associated with each piece of video content, such the content information of the piece of video content and/or user actions associated with the piece of video content, may be collected. According to one embodiment, one or more attributes or keywords is/are used, and any information regarding the piece of video content may be saved as an attribute or keyword. For example, one attribute may indicate the day and/or time the piece of video content has been viewed or recorded on the client device 310. A second attribute may indicate whether the piece of video content is related to one or more other pieces of video content, such as multiple episodes of a same television program series. A third attribute may indicate the title of the piece of video content. A fourth attribute may indicate the genre of the piece of video content, such as drama, science-fiction, animation, comedy, television program, documentary, etc. A fifth attribute may indicate the producer of the piece of video content. A sixth attribute may indicate the actors and actresses featured in the piece of video content. Additional attributes or keywords may include viewer or critic comments, tags, pull-ratings, etc. Of course, the specific attributes chosen for a particular application may be widely varied and any particular implementation may include fewer, more and/or different attributes.

The information about the video content may be obtained from multiple sources. For example, digital video data often includes metadata about the video clip itself, and such metadata may be parsed or mined to extract content information. Another source of content information is the subtitles or closed captioning (CC) provided with some of the video content. The subtitles may be parsed to extract words that describe the content of the video. Cable companies supply program guides that contain program descriptions or information, and the appropriate attribute data or keywords from these program guides may be extracted. There are many databases available that have information regarding individual pieces of video content. The content information may be downloaded from the appropriate databases, such as databases of movie studios, publishers, online merchants, non-profit organizations, etc.

The information obtained from different sources may be filtered and combined. For example, suppose that a device user has viewed an episode of a television series on his or her client device 310. The episode has a program ID assigned by the cable company. The program ID and episode title may be obtained from the electronic program guide (EPG) provided by the cable company, the name of the actors and actresses may be obtained from the television studio's website, the day and time the user watched the episode may be obtained from the recorded device usage data 316, and so on.

A device user profiler 312 constructs profile(s) for the user(s) of the client device 310. Again, information regarding the user(s) of the client device 310 may be obtained from a variety of different sources. For example, a user may input his or her information, such as demographical information, e.g., age, gender, education level, geographical location, etc., or preferences, directly into the client device 310. In addition or alternatively, user preferences may be automatically determined based on the types of video content that have been operated on the client device 310, and more specifically from the device usage information monitored and collected. If a user often watches videos relating to basketball games, for example, it may be an indication that the user likes sports and sports-related video content. Such information may be used to automatically determine user preferences.

From time to time, the video content ratings 450 and device user profiles are sent to the server 350 anonymously or semi-anonymously. If they are sent anonymously, then no identification about either the sending client device or the users of the sending client device is provided. If they are sent semi-anonymously, then some identification about the sending client device is provided to the server 350. The device users have the ability to control how much identification information is provided when sending video content ratings 450 and device user profiles to the server 350, e.g., from no identification information to some selected pieces of identification information to a complete set of identification information. The server 350 subsequently makes personalized recommendations based in part on the video content ratings 450 and device user profiles received from each client device 310.

Each client device 310 has a set of smart channels that are used to organize and contain personalized video content and advertisements tailored to the users of the individual client device 310. Initially, e.g., for a new device, there may be a default set of smart channels, such as factory or service default smart channels. The users of each client device 310 may then further customize the default set of smart channels on their device by manually adding channels to or removing channels from the default set of smart channels. Alternatively or in addition, the default set of smart channels may be adjusted automatically over time based on the device usage data. For example, if the monitored device usage data indicates that many travel programs have been viewed on the device, a smart channel relating to travel may be automatically added. Conversely, if the monitored device usage data indicates that a very few or no sports programs have been viewed on the device and there is a smart channel relating to sports currently existing on the device, the sport channel may be automatically removed.

From time to time or as needed, the set of smart channels on the device, whether manually chosen by the users or automatically determined based on the device usage data, may be further adjusted automatically based on the current device usage data, which includes data relating to users' interactions with the smart channels and the video content provided in the smart channels. For example, suppose a particular device, e.g., a television, is used by multiple users, e.g., members of a family. One group of users, e.g., the adults, prefer to watch one type of program, such as news, documentary, and drama movies, and another group of users, e.g., the children, prefer to watch another different type of program, such as animation and action movies. After the television is used by the adults for some period of time, the smart channels on the television may be automatically adjusted to include a news channel, a documentary channel, and a drama movie channel, because the recorded device usage data indicate that these are the types of programs often viewed by the current group of users. Subsequently, the television is used by the children for some period of time. The smart channels on the television may be automatically adjusted to include an animation channel and an action movie channel, while the news channel and the documentary may be removed from the smart channels, because the more recent device usage data indicate that these are the types of programs often viewed by the current group of users. As the recorded device usage data changes, the smart channels may be adjusted accordingly. Of course, the device users may manually override such automatic adjustment to choose any set of smart channels they prefer.

The channel builder 313 is responsible for maintaining the smart channels and the video content and advertisements contained in each of the smart channels. When appropriate, the channel builder 313 requests updated or additional video content and advertisements from the server 350 and refreshes or updates the video content and advertisements contained in the smart channels after receiving recommendations from the server 350 in response to the request. In addition, the channel builder 313 may modify the sequence of the video content and advertisements recommended by the server based on the device usage data.

For example, suppose a client device has four customized smart channels: New Movies, European Travel, Ballroom Dancing, and US News. The New Movies channel contains video content relating to movies newly released during the past week, e.g., movie trailers. The European Travel channel contains video content relating to travel in Europe, e.g., programs aired on the Travel Channel or videos shot by individual travelers. The Ballroom Dancing channel contains video content relating to ballroom dancing competitions, exhibitions, or instructions. The US News channel contains video content relating to news events that occurred in the United States, e.g., news footages aired on network television stations.

When the client device 310 is first powered on, the channel builder 313 may request updated video content and advertisements for each of the four smart channels from the server 350. The server 350 sends a specific number, e.g., twenty pieces of video content per smart channels, of the most relevant and/or the most recent pieces of video content for each of the four smart channels along with some suitable advertisements. The channel builder 313, upon receiving the recommendations from the server 350, updates the smart channels so that they each contains the newly received twenty pieces of video content.

Subsequently, as the device user views some of the video content and/or advertisements, the channel builder 313 may request additional video content and/or advertisements from the server 350 to replace the viewed video content and/or advertisements. For example, the device user may select the US News channel to view recent news reports. As the user views some or most of the twenty pieces of video content relating to news events in the United States contained in the US News channel, the channel builder 313 requests additional videos on US news events from the server 350 so that the user does not run out of the video content to view.

Usually, the server 350 ranks the recommended video content. Optionally, although not necessarily, the advertisements may also be ranked. The channel builder 313 has the option of modifying the rankings provided by the server 350 before presenting the recommended video content and advertisements to the device user. For example, if the most-recent device usage data indicates that the device user may be very interested in a particular piece of video, and yet the server 350 has ranked this piece of video relatively low, the channel builder 313 may increase the rank of this piece of video and present it to the device user before the other pieces.

The sizes of individual pieces of video content often vary greatly, depending on the quality and the length of the video content. DVD-quality movies usually range from six to eight gigabytes, while short video clips range from anywhere between a few megabytes to a few hundred megabytes. Thus, depending on the connection bandwidth available to the client device 310, e.g. broadband vs. narrow band or wired connections vs. wireless connections, it may take a few seconds to a few minutes to a few hours to download a particular piece of video content.

To avoid the inconveniences caused by long delays while downloading the video content to the client device 310 for viewing, a video content prefetcher 314 prefetches some or all of the video content in the smart channels and stores the video data locally in a video content/ads database 318 so that when the device user chooses to view a particular piece of video content, the video data is already available and ready for viewing.

How much video data the prefetcher 314 is able to obtain ahead of time usually depends on the size of memory storage available locally on the client device 310. If there is a large amount of storage space, then more pieces of video content may be obtained and stored ahead of time. Otherwise, only selected pieces of video content may be obtained and stored ahead of time. Thus, when there is insufficient storage space on the client device to store all the video content contained in the smart channels, it is necessary to make a selection as to which pieces of video content to prefetch. The memory storage may be, for example, flash memory or magnetic memory, and may be internally incorporated as a part of the device and/or externally memory storage add-ons to the device.

According to one embodiment, the channel builder 313 instructs the video content prefetcher 314 as to which pieces of video content to obtain and store locally. For example, the channel builder 313 may decide to prefetch the first several pieces of video content from each smart channel, or to prefetch those pieces of video content that have a running length longer than a predefine time period, such as ten minutes or one hour. Alternatively, the channel builder 313 may instruct the prefetcher 314 to prefetch top picks recommended by the server 350. In addition, selected advertisements may be prefetched in a similar manner.

Figure 5A:
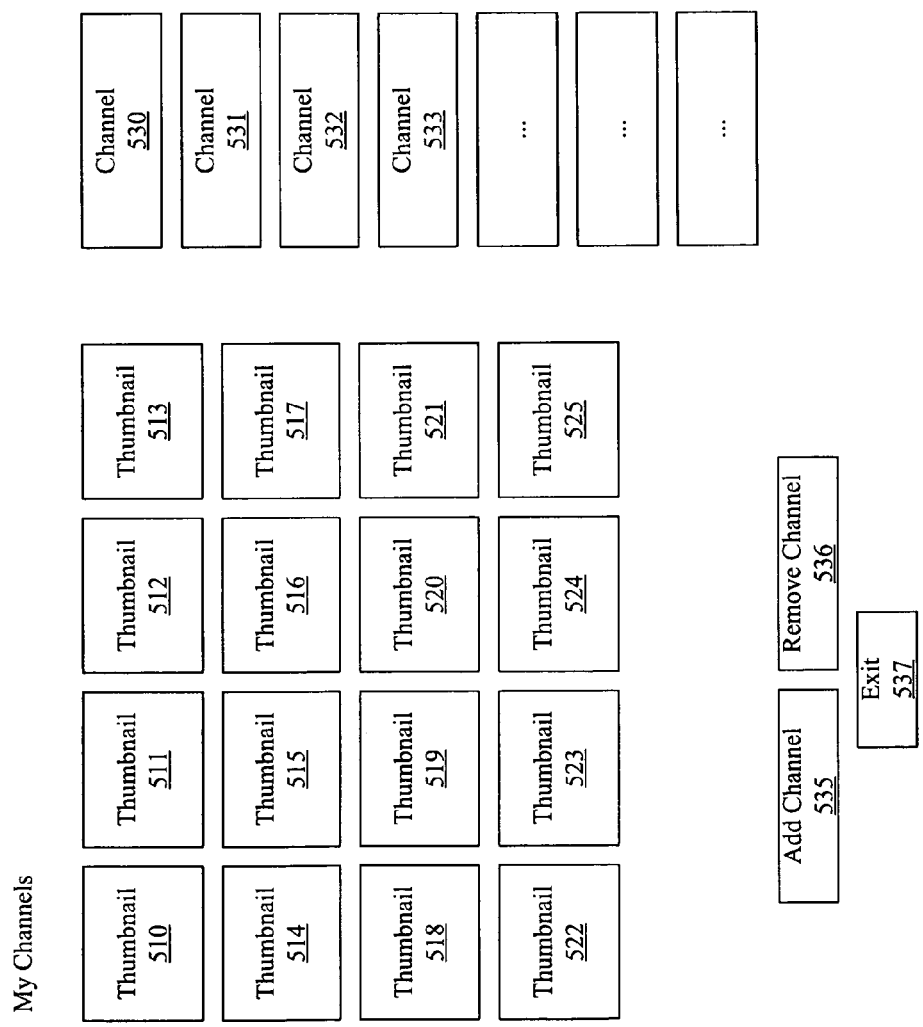
FIG. 5A shows one embodiment of a top-level menu 501 enables client device users to input command with respect to using the smart channels.

A presentation system 315, including a user interface, enables the device users to maintain the smart channels and select video content contained in the smart channels for viewing. FIG. 5A shows one embodiment of a top-level menu 501 that enables device users to input command with respect to using the smart channels. This menu 501 may appear on the display screen 320 of the client device 310 when the device users select the smart channels function. For example, if the client device 310 is a television, a viewer may select "My Channels" from the electronic program guide and be presented with this top-level menu 501.

In this embodiment, the top-level menu 501 includes sixteen thumbnails 510-525 associated with sixteen pieces of video content. These are the top picks recommended by the server 350. To view any of these top picks, the device user simply clicks on the thumbnail to start the playing of the selected piece of video content.

To the right is the list of smart channels 530-533 that are currently available on the client device 310. Each smart channel 530-533 contains one or more pieces of video content related to the subject matter or topic of that channel. To view the video content currently contained in a particular smart channel, the device user clicks on the appropriate channel button.

To the bottom are three control buttons. The Add Channel button 535 allows the device user to add a new smart channel. The Remove Channel button 536 allows the device user to remove an existing smart channel from the list of smart channels. The Exit button 537 allows the device user to exit the smart channel menu and return to normal device operations.

Suppose a user wishes to view the video content contained in channel 532 and clicks on the appropriate button. A second-level menu may then show the user the video content contained in the selected channel 532. FIG. 5B shows one embodiment of a second-level menu 502 that lists the individual pieces of video content contained in a specific smart channel.

In this embodiment, the second-level menu 502 associated with the individual smart channel 532 includes twenty thumbnails 540-559 associated with twenty pieces of video content respectively. To view any of these pieces of video content, the device user simply clicks on the thumbnail associated with the piece of video content to start the playing of the selected piece of video content. Optionally, a brief description may be provided for each piece of video content, including, for example, the video's title, length, rating, content keywords, producer, etc. The brief descriptions enable a device user to determine whether he or she is interested in the videos without having to watch the videos.

To the right of the menu 502 is a list of buttons, such that the device user may search additional videos related to a particular piece of video content. The relationship may be by topic, 560, by genre, 561, by action, 562, by producer, 563, etc. To the bottom of the menu 502 are several control buttons. The previous button 565 allows the user to jump to the previous twenty pieces of video content. The previous button 568 allows the user to skip to the next twenty pieces of video content. The main menu button 566 allows the user to return to the top-level menu 501. The Exit button 567 allows the device user to exit the smart channel menu and return to normal device operations.

Suppose the user wishes to find additional videos related to the video identified by the thumbnail 546 by genre. The user first selects the thumbnail 546 and then clicks the related video by genre button 561. The channel builder 313 sends a request to the server 350 for additional videos related to video 546 by genre. When the channel builder 313 receives additional video content recommendations from the server 350, the related videos may be presented to the user via another menu. FIG. 5C shows one embodiment of a menu 503 that presents a list of videos related to video 546 by genre.

In this embodiment, the menu 503 includes eight thumbnails 570-577 associated with eight pieces of video content respectively, and these eight pieces of video content all relate to video 546 by genre. To view any of these pieces of video content, the device user simply clicks on the thumbnail associated with the piece of video content to start the playing of the selected piece of video content. As before, a brief description may be provided for each piece of video content, including, for example, the video's title, length, rating, content keywords, producer, etc. Again, it should be appreciated that the types and extent of information presented in the brief description may be widely varied.

Similarly to menu 502, to the right of the menu 503 is the same list of buttons that allows the user to obtain additional videos related to one of the videos presented in the menu 503. To the bottom of the menu 503 are the control buttons. The previous button 584 allows the user to jump to the previous eight pieces of video content. The next button 587 allows the user to skip to the next eight pieces of video content. The main menu button 585 allows the user to return to the top-level menu 501. The Exit button 586 allows the device user to exit the smart channel menu and return to normal device operations.

The number of thumbnails presented at one time in each of the menus may vary among the different embodiments. Usually, the actually number is determined based on the size of the display screen 320 of the client device. Large display screen 320 can support relatively a larger number of thumbnails simultaneously, and vice versa. The number of pieces of video content sent by the server 350 for each request may also vary among the different embodiments.

In addition, the presentation system may enable the device users to enter specific keywords to search for related video content. Upon receiving a user input, the channel builder 313 sends the requested keywords to the server 350 and presents the recommended videos received from the server 350 to the device users.

When the server 350 sends recommended video content, the server 350 optionally sends personalized advertisements along with the video content. As the device users use the client device to view selected video content and/or advertisements, the presentation system 315 monitors the user actions and generates device usage data and stores the device usage data in the device usage database 316. The video content auto-rater 311 then uses the stored device usage data to automatically rate the video content viewed by the device users. When a particular advertisement is viewed and/or acted upon by the users, the presentation system 315 sends a notice to the server 350, reporting an "ad hit." Subsequently, the server 350 may use the information to collect ad revenue from ad providers.

Server Components

On the server side, the video content aggregator 351 collects and aggregates video content information from multiple sources and stores the aggregated video content information in a video content database 357. The content information of any type of videos, including movies, television, cable, or satellite programs, and videos available on the Internet, may be collected.

According to one embodiment, the video content information may be saved as attributes or keywords. Similarly to the operation on the client device 310, the video content aggregator 351 obtains content information from multiple sources such as metadata associated with the video content, electronic program guide, databases connected to the Internet, video content providers, subtitles or closed captioning, etc. However, the video content aggregator 351 attempts to obtain content information for all, or as much as possible, available video content.

The video content aggregator 351 filters the content information obtained from these different sources and aggregates the data into a single view. For example, duplicate information is discarded. Multiple pieces of information regarding the same piece of video content are combined. Incorrect pieces of information may be corrected using information obtained from alternative sources. By storing the aggregated video content information in a video content database 357 local to the server 350, the server 350 has quick access of this information when needed. Subsequently, the video content recommender 353 selects video content from the video content database 357 to recommend to the individual client device users.

Similarly, the ad provisioning 352 collects advertisements from multiple sources and stored the advertisements in an ads database 358 local to the server 350. The advertisements may be obtained from online advertising brokers, retrieved from open websites, etc. Subsequently, the ad matcher 354 selects advertisements from the ads database 358 that match the recommended video content to send to the individual client device users.

Upon receiving a request from a particular client device 310 for video content recommendations, the video content recommender 353 selects appropriate video content from the video content database 357 while taking into consideration of the video content ratings and device user profiles previously received from the requesting client device 310 stored in the client content ratings database 355 and client profiles database 356, if such information is available. If no client-device-specific content ratings and device user profiles are available, such as in the case of a new client device joining the service or a new server, then only the video content data 357 is used. Thus, the video content selected by the video content recommender 353 for the requesting client device is personally tailored to the requesting client device, and consequently its users.

Alternatively, the server may choose to send personalized video content and/or advertisements to selected client devices, such as client devices that remain powered on at all times, without waiting for any specific requests from the client devices. If the server is aware of the set of smart channels on each of the selected client devices, the server may determine video content for the set of smart channels on each of the selected client devices and send the video content to each of the selected client devices respectively.

The video content recommender 353 selects those pieces of video content from the video content database 357 that satisfies the request criteria received from the client device 310. For example, if the client device 310 requests video content related to a particular subject matter, e.g., French cuisine, the video content recommender 353 may select videos on cooking, especially cooking French dishes. If the client device request video content related to a particular genre, e.g., romantic drama, the video content recommender 353 may select movies such as Titanic, The English Patient, or Legends of the Fall. The video content recommender 353 may select video content collect from any sources, including movies, television, cable, or satellite programs, video clips available on the Internet, etc.

Once the pieces of video content are selected for a client request, the video content recommender 353 ranks the pieces according to some criteria, such as in the order or relevance, e.g., more relevant videos ranked higher, or in the order or date, e.g., newer videos ranked higher, and sends the ranked video content to the requesting client device. The ranking of the selected pieces of video content is for the purpose of presenting the video content to the device user(s) in a relatively orderly fashion. Often, there may be many pieces of video content, such as hundreds of pieces, that match the criteria of a request. Of course, it is unlikely that the device user(s) is/are able to view all selected pieces of video content simultaneously. Instead, the selected pieces of video content are presented to the device user(s) in a linear fashion, e.g., one at a time or a few at a time.

There exist many ranking algorithms that may be used to rank the selected pieces of video content. According to some embodiments, the video content recommender 353 ranks the selected pieces of video content using either ClipRank or a combination of ClipRank and collaborative filtering. ClipRank is described in more detail in co-pending U.S. patent application Ser. No. 12/120,209, filed on May 13, 2008 (concurrently herewith on the same day as the present application), entitled "CLIPRANK: A METHOD FOR RANKING MEDIA CONTENT USING THEIR RELATIONSHIP WITH END USERS" by Rathod et al., and the combination of ClipRank and collaborative filtering is described in more detail in co-pending U.S. patent application Ser. No. 120,211, filed on May 13, 2008 (concurrently herewith on the same day as the present application), entitled "COMBINATION OF COLLABORATIVE FILTERING AND CLIPRANK FOR PERSONALIZED RECOMMENDATION" by Nemeth et al., both of which are hereby incorporated by reference in their entireties and for all intents and purposes.

Additional factors that are taken into consideration when selecting and ranking the video content include the content ratings and user profiles received from the requesting client device, metadata associated with the video content, user actions with respect to the video content, such as creating, viewing, listening, commenting, choosing as favorites, etc.

Once the appropriate video content has been selected for a requesting client device 310, the ad matcher 354 selects advertisements from the ads database 358 to be sent to the requesting client device along with the recommended video content. The advertisements are selected based on one or more factors, such as recommended video content, context, user profile, and ad scheduling information. For example, if a client device requests video content relating to basketball games, the ad matcher 354 may select advertisements on sports apparel or shoes, basketball memorabilia, etc. If a client devices requests video content relating to performances by a particular music group, the ad matchers 354 may select advertisements on CDs or DVDs by that same music group or tickets currently on sale for performances by the music group. According to some embodiments, the advertisements are also ranked according to some criteria, similar to the selected video content. The ranked advertisements are sent to the client device along with the selected video content. Alternatively, according to other embodiments, some or all of the selected pieces of video content are each associated with one or more personalized advertisements, such that when the users view a particular piece of video content, its associated advertisements are presented at specific intervals, e.g. during commercial breaks.

Interactions Between Client and Server

Figure 6A:
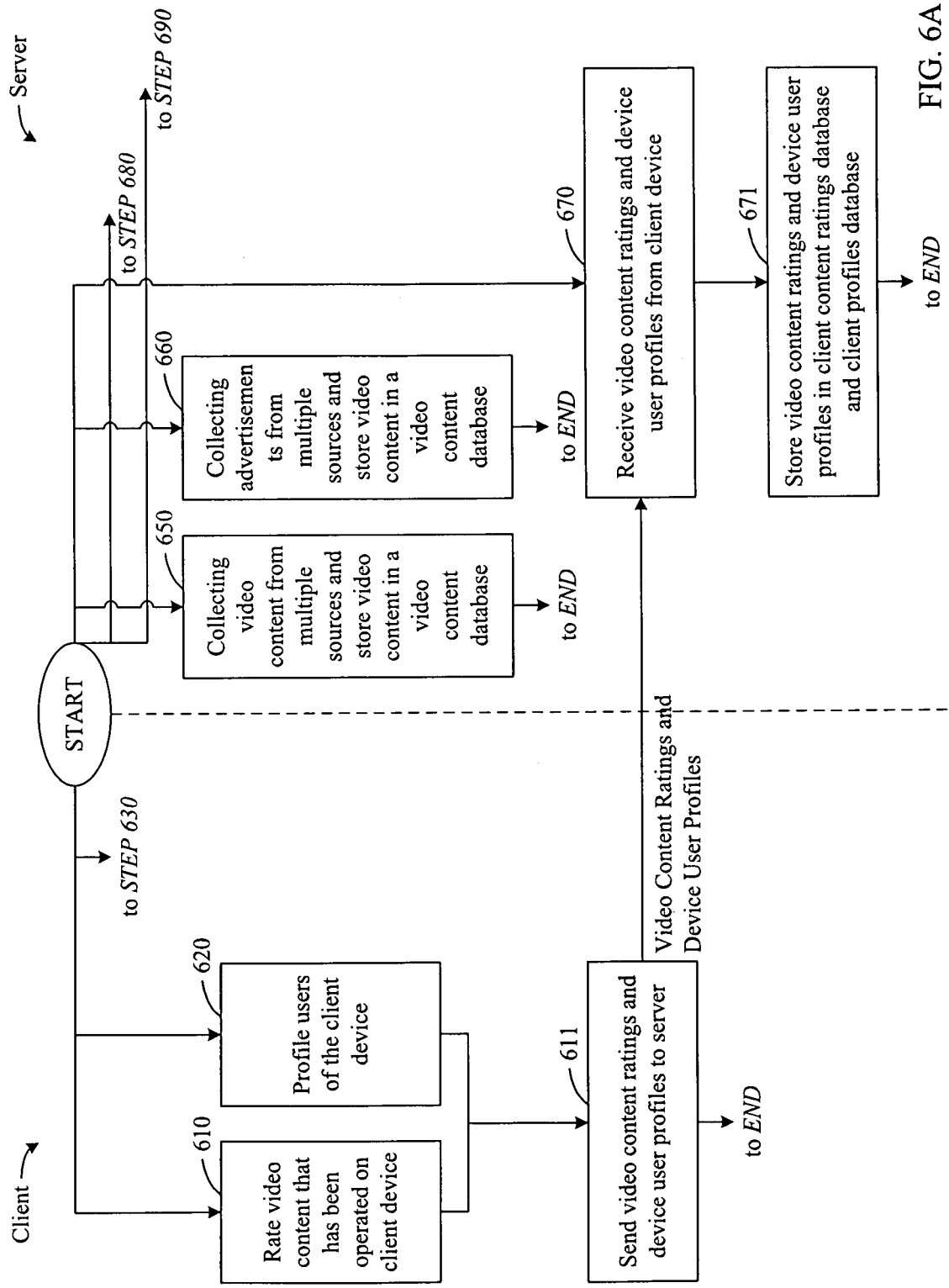
FIGS. 6A-6C shows one embodiment of the interactions between various components of the client device and the server.
Figure 6B:
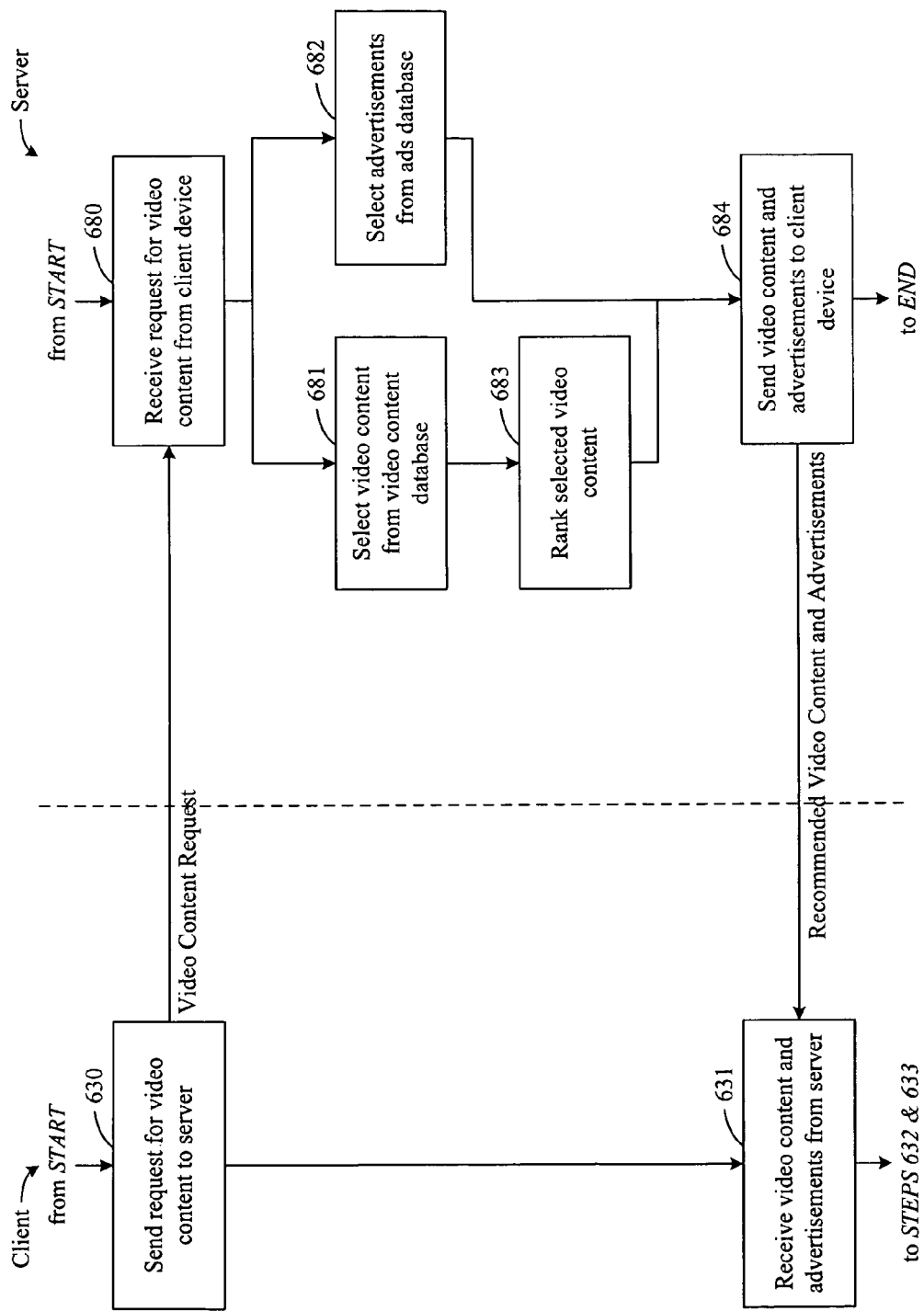
Figure 6C:
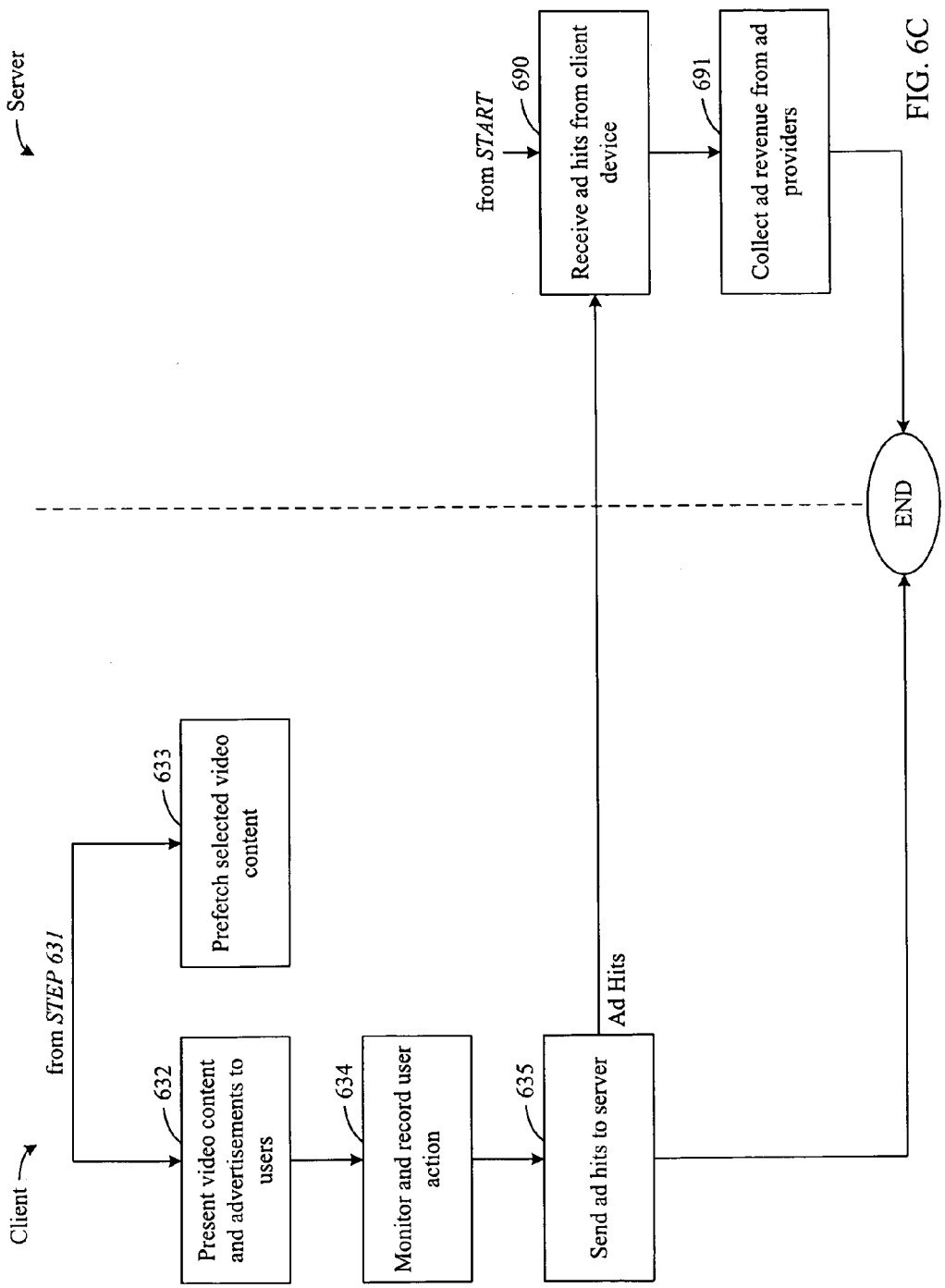

FIGS. 6A-6C shows one embodiment of the interactions between the client and server components described above. In the figures, to the left of the dashed line are steps performed by the client components and to the right of the dashed line are steps performed by the server components. Some steps may be performed in serial or parallel, while other steps need to be performed in serial when a later step depends on the result of an earlier step. The steps may be divided into several groups.

First, with respect to the process of rating video content that have been operated, e.g., viewed, recorded, downloaded, etc., on a client device and profiling the device user(s), on the client side, the recorded device usage data is used to automatically rate the video content that has been operated on the client device in reference to a set of predefined rating rules (step 610). The profile(s) of the device user(s) is/are extracted from various sources, such as monitored user actions or user input data (step 620). Steps 610 and 620 may be performed in parallel or in serial and are repeated many times while the client device is used to view more video content. From time to time, such as once a day, the video content ratings and device user profiles are sent to the server (step 611). On the server side, the server receives and video content ratings and device user profiles from the client device (step 670) and stores these ratings and profiles in the client content ratings database and client profiles database respectively (step 671).

Next, with respect to the process of collecting video content and advertisements on the server side, the server collects, or has available to it, video content from multiple sources, such as movie databases, television programs, and video clips available on the Internet. Such content may be stored in a video content database or may be accessible from other known locations (step 650). Similarly, the server collects advertisements from various sources, such as ad providers or publishers, and stores the advertisements in an ads database (step 660). Steps 650 and 660 are generally performed in parallel but may be performed in serial as well, and are repeated as time passes to collect new and additional video content and advertisements as they become available.

Finally, with respect to the process of presenting personalized video content to the device users, on the client side, a request for video content is sent to the server (step 630). The request is based on the smart channels defined on the client device, i.e., request video content suitable for each of the smart channels on the client device. For example, when the device is first powered on, a request is sent to the server for the updated video content. On the server side, the server receives the request for video content from the client device (step 680). Suitable video content is selected that meet the criteria specified by the client request from the video content database (step 681), and the selected video content is ranked using a combination of ClipRank and collaborative filtering methods (step 683). In addition, the content ratings and device user profiles received from the client and stored in the client content ratings database and client profiles database may be taken into consideration, if such information is available, so that the selected and ranked video content are tailored to the device users. One or more advertisements is/are selected from the ads database based on the selected video content (step 682). The advertisements may be associated with specific pieces of selected video content. The server sends the selected video content and advertisements to the requesting client device (step 684).

On the client side, upon receiving the recommended video content and advertisements, they are presented to the device users via a user interface (step 632). The order of the video content and advertisements may be modified based on the recorded device usage data. The client device may select some or all of the video content and prefetch the video data to avoid delays while the users are viewing the videos (step 633).

Users' actions with respect to viewing the recommended video content and advertisements are monitored and recorded (step 634). If the users interact, e.g., view, any advertisements, the information is reported to the server (step 635). On the server side, ad hits reports received from the client device (step 690) may subsequently be used to collect ad revenue from the ad providers (step 691). Again, these steps may be repeated multiple times. New requests for additional video content may be sent to the server as needed. The new recommendations may be presented to the device users as they are received from the server.

The personalized video content recommendation system may function in connection with any type of consumer electronic device. For example, when used with a television, the system provides a personalized television viewing experience. In additional to traditional television programs, users are able to watch video programs available from other sources, such as the Internet, while preserving the existing television concepts, such as the concept of channels. By selecting advertisements based on the users' viewing habit, the advertisements are tailored to the individual users' interests, and consequently improve the relevance of advertising. In addition, the system functions automatically, so that the users are not required to provide any specific input.

Figure 7:
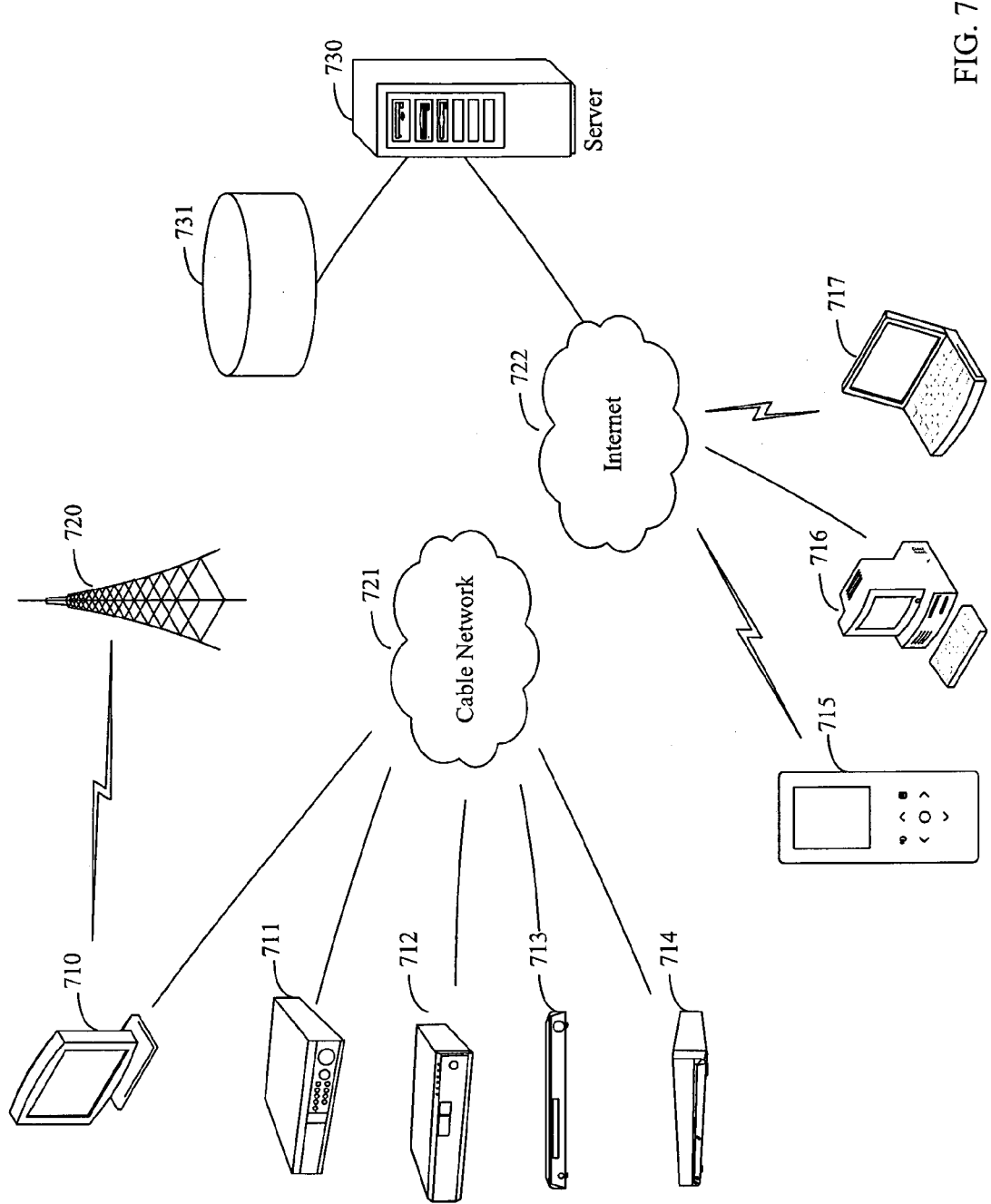
FIG. 7 is a simplified diagram of a network environment in which specific embodiments of the present invention may be implemented.

FIG. 7 is a simplified diagram of a network environment in which specific embodiments of the present invention may be implemented. The personalized video content recommendation system may be a part of different types of media devices capable of supporting various types of video operations, such as televisions 710, digital or analog video recorders 711, audio/video controllers 712, DVD players or VCRs 713, set top boxes 714, or portable media players 715. The personalized video content recommendation system may also be a part of different types of personal computers, such as desktop computers 716 of notebook computers 716.

The video content may be collected from different sources. Some may be broadcasted 720. Some may be delivered via dedicated cable networks 721. Some may be distributed on the Internet 722. Some may be stored in databases accessible by the server 730.

One or more database 731 is/are communicatively linked to the server 730, which is/are used to store client video content ratings and device user profiles, as well as video content and advertisements collected from multiple sources.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, as described above, according to some embodiments, a set of personalized channels are used to organize personalized video content on the client devices. However, it is not necessary to always have personalized channels on client devices. According to other embodiments, the personalized video content and optionally the personalized advertisements may be presented to the device users together, without being categorized or divided into separate channels. For example, personalized video content regarding different subject matters may be presented together. Furthermore, FIGS. 5A-5C describes a user interface that enables the device users to select particular pieces of video content from each of the smart channels. Alternatively, according to other embodiments, the device users may be unable to select individual pieces of video content from a smart channel. Instead, the pieces of video content contained in a smart channel are presented to the device users in the order of their ranks, and the device users view the pieces of video content according to their ranks one at a time. It is therefore intended that the following appended claims be interpreted as including all such alterations, permutations, and various substitute equivalents as fall within the true spirit and scope of the present invention.

What is claimed is:

1. A method of forming personalized channels for providing personalized content, comprising:

monitoring device usage information for a client device configured for playing content;

determining user interests by generating content ratings based on the device usage information and content rating rules for the client device, wherein each content rating corresponds to a piece of content played on the client device;

providing the content ratings and at least one user profile for the client device to a remote server;

receiving one or more pieces of content related to at least one user interest from the remote server, wherein said one or more pieces of content is based on the content ratings and said at least one user profile;

generating at least one personalized channel on the client device, wherein each personalized channel is associated with a user interest, wherein each personalized channel comprises personalized content including at least one piece of content related to a user interest associated with said personalized channel, and wherein personalized content for each personalized channel is aggregated from different content sources; and automatically updating information corresponding to said at least one personalized channel based on device usage information, wherein the information corresponding to said at least one personalized channel includes the number of personalized channels on the client device, and wherein the number of personalized channels adjusts automatically over time based on updated device usage information.

2. A method as recited in claim 1, further comprising:
providing a menu showing individual pieces of content for each personalized channel; and
in response to a user selection of one of the individual pieces of content, playing the selected piece of content on the client device and an associated customized advertisement.

3. The method of claim 2, further comprising:
prefetching user selected pieces of content to reduce downloading delays for the selected pieces of content; and
storing pre-fetched pieces of content on the client device.

4. A method as recited in claim 1, further comprising:
automatically updating at least one personalized channel based on updated device usage information; and
automatically updating at least one piece of content for each personalized channel based on the updated device usage information.

5. The method of claim 1, wherein:
the different content sources include at least one Internet source.

6. The method of claim 1, wherein:
the personalized content for each personalized channel includes video content.

7. The method of claim 1, wherein:
the user interest associated with a personalized channel represents a theme or topic of interest.

8. The method of claim 1, further comprising:
determining customized advertisements for each personalized channel based on the content ratings and the personalized content for said personalized channel.

9. The method of claim 1, further comprising:
permitting user control of the degree at which the content ratings and said at least one user profile are rendered anonymous to the remote server;
wherein the content ratings and said at least one user profile are sent to the remote server either anonymously or semi-anonymously to preserve user privacy.

10. The method of claim 1, wherein:
said at least one personalized channel is adjusted over time based on the device usage information; and
said at least one personalized channel is adjusted by at least one of automatically adding a personalized channel to said at least one personalized channel and automatically removing a personalized channel from said at least one personalized channel.

11. The method of claim 10, wherein:
one or more pieces of content included in a personalized channel is presented in a ranked order.

12. A method of providing personalized content to a user of a consumer electronic device, comprising:
monitoring device usage information for a media device configured for playing content;
determining user interests by generating content ratings based on the device usage information and content rating rules for the media device, wherein each content rating corresponds to a piece of content played on the media device;
transmitting the content ratings and at least one user profile for the media device to a remote content server;
receiving, at the media device one or more pieces of content related to at least one user interest from the remote content server, wherein said one or more pieces of content is selected based at least in part on the content ratings and said at least one user profile;
presenting, on the media device, a plurality of personalized channels, wherein each personalized channel is associated with a user interest, wherein each personalized channel comprises personalized content including at least one piece of content related to a user interest associated with said personalized channel, and wherein personalized content for each personalized channel is aggregated from a plurality of different content sources including at least one Internet source;
receiving, at the media device, a user selection of a piece of content included in a personalized channel;
playing, on the media device, the selected piece of content; and
automatically updating information corresponding to the plurality of personalized channels based on device usage information, wherein the information corresponding to the plurality of personalized channels includes the number of personalized channels on the media device, and wherein the number of personalized channels adjusts automatically over time based on updated device usage information.

13. A method as recited in claim 12, further comprising:
prefetching the selected piece of content; and
temporarily storing the prefetched selected piece of content on the media device.

14. A method as recited in claim 12, further comprising:
requesting additional content related to the selected piece of content; and
presenting the additional content.

15. A method as recited in claim 12, further comprising:
receiving a user selection of a piece of advertisement included in a personalized channel;
playing the selected piece of advertisement on the media device; and
notifying the remote content server of the selected piece of advertisement.

16. The method of claim 12, further comprising:
presenting personalized advertisements for the personalized channel; and
notifying the server of a user selection of a particular piece of personalized advertisement.

17. The method of claim 12, wherein:
the plurality of personalized channels is adjusted over time based on the device usage information; and
the plurality of personalized channels is adjusted by at least one of automatically adding a personalized channel to said at least one personalized channel and automatically removing a personalized channel from said at least one personalized channel.

18. A media device suitable for playing video content including television programming, the device comprising:
a device usage monitor configured to automatically monitor usage information related to content played on the media device;
a rating engine configured to automatically generate content ratings for the content played on the media device, wherein the content ratings are based at least in part on the usage information; and
a user interface configured to present a plurality of content channels, wherein the content channels comprise at least one personalized channel, wherein each personalized channel is associated with a user interest and comprises personalized content including at least one piece of content related to said user interest, wherein personalized content for each personalized channel is selected based at least in part on the content ratings generated by the rating engine, and wherein personalized content for each personalized channel is aggregated from a plurality of different content sources including at least one Internet source;

wherein information corresponding to the at least one personalized channel is automatically updated based on usage information, wherein the information corresponding to the at least one personalized channel includes the number of personalized channels on the media device, and wherein the number of personalized channels adjusts automatically over time based on updated usage information.

19. A media device as recited in claim 18, wherein:
at least some of the personalized channels are arranged to have a plurality of distinct pieces of content associated therewith;
the user interface is further configured to present overview information that identifies a plurality of distinct pieces of content that may be viewed in response to a user selection of a particular personalized channel; and
in response to a user selection of a particular piece of content from the plurality of presented pieces of content associated with the selected channel, the media device causes the selected piece of content to play.

20. A media device as recited in claim 18, wherein the media device is a consumer electronics device selected from a group comprising a television, a video recorder, a mobile multimedia player, a cable box, and a set top box.

21. A media device as recited in claim 18, wherein:
personalized content for a personalized channel comprises a collection of pieces of content;
a ranking of the pieces of content included in the personalized channel is provided; and the
pieces of content included in the personalized channel are individually selectable.

22. The media device of claim 18, wherein:
the user interface is suitable for:
in response to a user selection of a personalized channel from the plurality of content channels, presenting a plurality of pieces of content included in the selected personalized channel; and
in response to a user selection of a piece of content from the plurality of pieces of content included in the selected personalized channel, causing the media device to play the selected piece of content.

23. The media device as recited in claim 22, further comprising:
a profiling engine configured to automatically determine user profiles;
wherein personalized content for each personalized channel is selected further based at least in part on the user profiles determined by the profiling engine.

24. The media device as recited in claim 23, wherein a user profile comprises information selected from a group comprising gender, sex, geographical location, and preference.

25. The media device as recited in claim 22, wherein the user interface is further suitable for providing playback control while the selected piece of content is played on the media device.

26. The media device as recited in claim 22, wherein the media device is a consumer electronic device selected from a group comprising a television, a video recorder, a mobile multimedia player, a cable box, and a set top box.

27. The media device as recited in claim 22, wherein each of the plurality of the rating rules comprises a device usage pattern and a rating action, wherein when the device usage pattern of a particular rating rule is inferred from the monitored usage of the media device, the rating action of that rating rule is used to adjust a content rating for a piece of content associated with the monitored usage of the media device.

28. The media device as recited in claim 18, wherein the media device:
receives content from a remote server;
provides content ratings to the remote server; and
in response to a user input, adjust the amount of personal identity information sent from the media device to the remote server by at least two different settings to permit user control of the degree to which content ratings and associated user profile information is rendered anonymous to the remote server.

29. The media device as recited in claim 18, further comprising:
a transceiver configured to:
transmit the content ratings generated by the rating engine and the user profiles determined by the profiling engine to a remote server system; and
receive the personalized channels and the content associated with each of the personalized channels from the remote server system.

30. The media device as recited in claim 18, further comprising:
a channel manager configured to manage and update the personalized channels and the content associated with each of the personalized channels;
wherein the at least one personalized channel is adjusted over time based on the usage information; and
wherein the at least one personalized channel is adjusted by at least one of automatically adding a personalized channel to said at least one personalized channel and automatically removing a personalized channel from said at least one personalized channel.

31. The media device as recited in claim 30, wherein the channel manager is configured to request updated personalized channels and updated personalized content for the updated personalized channels to be presented each time when the media device is powered on.

32. The media device as recited in claim 18, further comprising:
a prefetcher configured to obtain at least one piece of content included in at least one personalized channel in anticipation of user selection of said at least one piece of content via the user interface for playback on the media device.

33. A computer program product for providing personalized video content to a user of a consumer electronic device, the computer program product comprising a non-transitory computer-readable medium having a plurality of computer program instructions stored therein, which are operable to cause at least one computing device to:
monitor device usage information for a media device configured for playing content;
determine user interests by generating content ratings based on the device usage information and content rating rules for the media device, wherein each content rating corresponds to a piece of content played on the media device;
transmit the content ratings and at least one user profile for the media device to a remote content server;
receive one or more pieces of content related to at least one user interest from the remote content server, wherein said one or more pieces of content is selected based at least in part on the content ratings and said at least one user profile;
present, on the media device, a plurality of personalized channels, wherein each personalized channel is associated with a user interest, wherein each personalized channel comprises personalized content including at least one piece of content related to a user interest associated with said personalized channel, and wherein personalized content for each personalized channel is aggregated from a plurality of different content sources including at least one Internet source;

receive a user selection of a piece of content included in a personalized channel;

play the selected piece of content on the media device; and automatically update information corresponding to the plurality of personalized channels based on device usage information, wherein the information corresponding to the plurality of personalized channels includes the number of personalized channels on the media device, and wherein the number of personalized channels adjusts automatically over time based on updated device usage information.

34. The computer program product as recited in claim 33, wherein:

the plurality of personalized channels is adjusted based on the device usage information; and the plurality of personalized channels is adjusted by at least one of automatically adding a personalized channel to the plurality of personalized channels and automatically removing a personalized channel from said the plurality of personalized channels.

35. The computer program product as recited in claim 33, wherein the plurality of computer program instructions are further operable to:

prefetch the selected piece of content; and temporarily store the prefetched selected piece of content on the media device.

36. The computer program product as recited in claim 33, wherein the plurality of computer program instructions are further operable to:

request additional content related to the selected piece of content; and present the additional content.

37. The computer program product as recited in claim 33, wherein the plurality of computer program instructions are further operable to:

receive personalized advertisement selected based at least in part on the content ratings and said at least one user profile from the remote content server; and present the personalized advertisement.

38. The computer program product as recited in claim 37, wherein the plurality of computer program instructions are further operable to:

receive a user selection of a particular piece of personalized advertisement;

play the selected piece of personalized advertisement on the media device; and notify the remote content server of the selected piece of personalized advertisement.

39. A system for providing personalized content via consumer electronic devices, comprising:

a server suitable for:

receiving content ratings from each consumer electronic device;

selecting one or more pieces of content for each consumer electronic device based at least in part on content ratings received from said consumer electronic device; and transmitting one or more pieces of content selected for each consumer electronic device to said consumer electronic device;

wherein each consumer electronic device is suitable for presenting a plurality of personalized channels, wherein each personalized channel comprises personalized content including at least one piece of content related to a user interest associated with said personalized channel, wherein personalized content for each personalized channel is aggregated from a plurality of different content sources including at least one Internet source;

wherein personalized content for each personalized channel for each consumer electronic device further comprises a ranking of pieces of content, wherein said pieces of content are presented in a recommended order based at least in part on usage behavior for said consumer electronic device;

wherein, for each consumer electronic device, information corresponding to the plurality of personalized channels on said consumer electronic device is automatically updated based on device usage information;

wherein, for each consumer electronic device, information corresponding to the plurality of personalized channels on said consumer electronic device includes the number of personalized channels on said consumer electronic device; and wherein, for each consumer electronic device, the number of personalized channels on said consumer electronic device adjusts automatically over time based on updated device usage information.

40. The system as recited in claim 39, wherein:

the plurality of personalized channels for a consumer electronic device is adjusted over time based on usage information for said consumer electronic device; and the plurality of personalized channels for a consumer electronic device is adjusted by at least one of automatically adding a personalized channel to the plurality of personalized channels and automatically removing a personalized channel from the plurality of personalized channels.

41. The system as recited in claim 39, wherein each consumer electronic device is further suitable for:

receiving a user selection of a piece of content included in a personalized channel; and playing the piece of the content selected.

42. The system as recited in claim 41, wherein each consumer electronic device is further suitable for:

requesting additional content related to the piece of content selected from the server;

receiving the additional content from the server; and presenting the additional content.

43. The system as recited in claim 42, wherein each consumer electronic device is further suitable for:

receiving a user selection of a piece of the additional content; and playing the piece of the additional content selected.

44. The system as recited in claim 39, wherein:

each consumer electronic device is further suitable for:

receiving personalized advertisement selected by the server; and presenting the personalized advertisement selected by the server; and the server is further suitable for:

selecting the personalized advertisement for each consumer electronic device based at least in part on the content ratings received from that consumer electronic device; and transmitting the personalized advertisement selected for each consumer electronic device to that consumer electronic device.

45. The system as recited in claim 44, wherein each consumer electronic device is further suitable for:

receiving a user selection of a particular piece of the personalized advertisement;

playing the particular piece of the personalized advertisement selected; and notifying the server of the particular piece of personalized advertisement selected.

46. The system as recited in claim 39, wherein each consumer electronic device is further suitable for:

prefetching selected pieces of content; and temporarily storing the prefetched selected pieces of content.

* * * * *